United States Patent
Kobayashi (10) Patent No.: US 12,326,186 B2
(45) Date of Patent: Jun. 10, 2025

(54) STRAIN WAVE GEARING AND ACTUATOR

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 17/999,511

(22) PCT Filed: Aug. 27, 2021

(86) PCT No.: PCT/JP2021/031593
§ 371 (c)(1),
(2) Date: Nov. 21, 2022

(87) PCT Pub. No.: WO2023/026488
PCT Pub. Date: Mar. 2, 2023

(65) Prior Publication Data
US 2025/0075785 A1   Mar. 6, 2025

(51) Int. Cl.
*F16H 49/00* (2006.01)
*F16H 19/08* (2006.01)

(52) U.S. Cl.
CPC .......... *F16H 49/001* (2013.01); *F16H 19/08* (2013.01); *F16H 2049/003* (2013.01)

(58) Field of Classification Search
CPC .. F16H 49/001; F16H 19/08; F16H 2049/003; F16H 2049/008; F16H 55/0833
See application file for complete search history.

(56) References Cited

U.S. PATENT DOCUMENTS

| | | | | |
|---|---|---|---|---|
| 2007/0199405 A1* | 8/2007 | Kobayashi | ............ | F16H 49/001 74/640 |
| 2020/0003256 A1* | 1/2020 | Koroyasu | ............. | F16C 19/546 |

FOREIGN PATENT DOCUMENTS

| | | | | |
|---|---|---|---|---|
| DE | 102019210795 A1 * | 1/2021 | ......... | F16H 49/001 |
| DE | 102020107674 B3 * | 8/2021 | ......... | F16H 49/001 |
| JP | 2007231996 A * | 9/2007 | ......... | F16H 49/001 |
| JP | 2018132154 A | 8/2018 | | |

(Continued)

OTHER PUBLICATIONS

International Search Report (PCT/ISA/210) and Written Opinion (PCT/ISA/237) mailed on Nov. 9, 2021, by the Japan Patent Office as the International Searching Authority for International Application No. PCT/JP2021031593. (8 pages).

*Primary Examiner* — Zakaria Elahmadi
(74) *Attorney, Agent, or Firm* — Buchanan Ingersoll & Rooney PC (57) ABSTRACT

A strain wave gearing has a detection mechanism that detects thrust force generated between a wave generator and an externally toothed gear. The detection mechanism is provided with a strain gauge or piezoelectric load meter, and a transmission mechanism that transmits thrust force from the wave generator to the load meter. Only rotational force is transmitted to the wave generator from a from a motor shaft side, and axial force is not transmitted. The load meter and the transmission mechanism provide a small and compact detection mechanism that can be incorporated inside the externally toothed gear. In the strain wave gearing into which the detection mechanism is incorporated, operation control according to detected thrust force becomes possible using thrust force information during operation.

9 Claims, 4 Drawing Sheets

(56) References Cited

FOREIGN PATENT DOCUMENTS

| JP | 2019105314 A | | 6/2019 | |
|----|--------------|---|--------|---|
| JP | 2021042848 A | | 3/2021 | |
| JP | 2021076198 A | * | 5/2021 | ........... F16H 49/001 |

* cited by examiner

STRAIN WAVE GEARING AND ACTUATOR

TECHNICAL FIELD

The present invention relates to a strain wave gearing provided with a mechanism for detecting thrust force and an actuator.

BACKGROUND ART

In a strain wave gearing, thrust force in a direction toward a reduced-rotation output side acts on a wave generator during reduced-speed outputting operation, and thrust force in the opposite direction acts on the wave generator during increased-rotation outputting operation.

With this matter in focus, in Patent Document 1, the inventor proposed a method with which it is possible to significantly reduce input-side holding torque needed to hold a wave generator, which is an input-side rotating member in a cup-profile or top-hat-profile strain wave gearing, so that the wave generator does not rotate due to load-side torque. With this method, input-side holding torque is reduced using the difference in the direction of thrust force acting on the wave generator during reduced-rotation outputting operation and during increased-rotation outputting operation in a strain wave gearing provided with a cup-shaped or top-hat-shaped flexible externally toothed gear.

Strain wave gearings referred to as pancake-or flat-profile are also known. This type of strain wave gearing is provided with two internally toothed gears, a cylindrical flexible externally toothed gear coaxially disposed on the inner sides of the internally toothed gears, and a wave generator coaxially fitted on the inner side of the externally toothed gear. One internally toothed gear is a fixed-side (stationary-side) gear having a different number of teeth than the externally toothed gear, and the other internally toothed gear is an output-side (drive-side) gear that has the same number of teeth as and rotates integrally with the externally toothed gear. In a reduced-rotation outputting operation, when high-speed rotation is inputted to the wave generator from a motor or the like, the rotation of the wave generator is significantly reduced according to the difference in the number of teeth between the fixed-side internally toothed gear and the externally toothed gear, and the externally toothed gear rotates at a reduced speed. The reduced-speed rotation is outputted from the output-side internally toothed gear, which rotates s integrally with the externally toothed gear, to the load side. Conversely, in an increased-rotation outputting operation, the input rotation from the output-side internally toothed gear is significantly increased between the externally toothed gear and the fixed-side internally toothed gear, and increased-speed rotation is outputted from the wave generator.

The externally toothed gear of a pancake-or flat-profile strain wave gearing is subject to "walking," in which the externally toothed gear moves in an axial direction (thrust direction) due to thrust force generated in reduced-rotation outputting and increased-rotation outputting operations. In order to limit the movement of the externally toothed gear in the axial direction to a permissible movable range, a regulating member is disposed to regulate the movement of the externally toothed gear. For example, in a flexible meshing gear device (strain wave gearing) described in Patent Document 2, regulating members are disposed on both sides of an externally toothed gear, and movement of the externally toothed gear in an axial direction is limited.

PRIOR ART LITERATURE

Patent Documents

[Patent Document 1] JP 2007-231996 A
[Patent Document 2] JP 2019-105314 A

DISCLOSURE OF THE INVENTION

Problems to be Solved by the Invention

Thus, in a strain wave gearing, thrust force is generated during reduced-rotation outputting and increased-rotation outputting operations, but there is no small, detector that can be built in and that detects thrust force. If there was a small detector that could be built in, it would be possible to perform operation control corresponding to the detected force, thrust using information pertaining to thrust force during operation.

In view of these matters, it is an object of the present invention to provide a strain wave gearing provided with a small, built-in mechanism for detecting thrust force, and an actuator provided with said strain wave gearing.

Means Used to Solve the Above-Mentioned Problems

A strain wave gearing of the present invention has
a rigid internally toothed gear,
a flexible externally toothed gear disposed coaxially inside the internally toothed gear,
a wave generator that is disposed coaxially inside the externally toothed gear and that causes the externally toothed gear to flex into a non-circle and partially mesh with the internally toothed gear, and
a detection mechanism that detects thrust force generated between the wave generator and the externally toothed gear,
the detection mechanism being provided with
a load meter disposed in a fixed position in a direction of a device axis and
a transmission mechanism that transmits the thrust force to the load meter,
the wave generator being provided with a rotating shaft part linked to a motor shaft or another external rotating shaft so as to rotate integrally while being able to relatively move in the direction of the device axis, and
the transmission mechanism being linked to the rotating shaft part of the wave generator so as not relatively move in the direction of the device axis while being capable of relative rotation.

In the strain wave gearing of the present invention, only rotational force is transmitted from the exterior to the rotating shaft part of the wave generator, and axial force is not transmitted. Thrust force generated between the rotating shaft part of the wave generator and the externally toothed gear acts as axial force on the rotating shaft part. Thrust force is exerted on the load meter via the transmission mechanism linked to the rotating shaft part, and the thrust force is detected by the load meter. A strain gauge meter or a piezoelectric meter can be used as the load meter.

Effects of the Invention

According to the present invention, the load meter and the transmission mechanism provide a small and compact detection mechanism that can be incorporated inside the externally toothed gear. In a strain wave gearing into which this detection mechanism is incorporated and in an actuator having said strain wave gearing and a motor, operation control corresponding to detected thrust force becomes possible using thrust force information during operation.

MODE FOR CARRYING OUT THE INVENTION

An embodiment of a strain wave gearing to which the present invention is applied is described below with reference to the drawings. The embodiment described below is one example of the present invention; the present invention is not intended to be limited to the embodiment.

Overall Configuration

The present invention shall now be described with reference to FIGS. 1A and 1B. A cup-profile strain wave gearing 1 to which the present invention is applied comprises a rigid internally toothed gear 2, a cup-shaped flexible externally toothed gear 3 disposed coaxially inside the internally toothed gear, a wave generator 4 coaxially fitted inside the externally toothed gear, and a detection mechanism 5 incorporated inside the externally toothed gear 3. The detection mechanism 5 detects thrust force generated between the externally toothed gear 3 and the wave generator 4. A detection result from the detection mechanism 5 is supplied to a drive control device 20 either by wire or wirelessly. The drive control device 20 is mainly constituted of a computer, and is provided with, inter alia, an operating state determination unit 20a that determines the operating state of the strain wave gearing 1 on the basis of the detection result, and an operation control unit 20b that controls the operating state of the strain wave gearing 1.

In the present example, the internally toothed gear 2 is a fixed-side member, and the wave generator 4 is an input-side member which is coaxially linked to a motor shaft 6 and to which high-speed rotation is inputted. The externally toothed gear 3 is an output-side member to which a disc-shaped output shaft 7 is coaxially linked and reduced rotation is outputted.

The internally toothed gear 2 is integrally formed in a cylindrical device housing 8. A disc-shaped end plate 9 is coaxially attached to an end surface of the device housing 8 on one side (input side) in the direction of an axis 1a. The motor shaft 6 extends through a center opening in the end plate 9. The motor shaft 6 is rotatably supported by the end plate 9 via a bearing, and is coaxially linked to the wave generator 4. The output shaft 7 linked to the externally toothed gear 3 is rotatably supported via a cross roller bearing 10 on an end surface of the device housing 8 on the opposite side (output side) in the direction of the axis 1a.

The externally toothed gear 3 is provided with a radially flexible cylindrical barrel part 31, external teeth 32 formed on an external peripheral surface portion of the cylindrical barrel part 31 at the side of an open end, a diaphragm 33 extending radially inward from the end of the cylindrical barrel part 31 on the side opposite the open end, and an annular rigid boss 34 joined to an internal peripheral edge of the diaphragm 33. The externally toothed gear 3 is coaxially fitted inside the internally toothed gear 2, and the external teeth 32 face internal teeth 21 of the internally toothed gear 2 from the radially inner side. The boss 34 is sandwiched between an annular pressing member 11 and the output shaft 7, and these three members are securely fastened by a plurality of fastening bolts.

The wave generator 4 is provided with a hollow rotating shaft part 42 having a shaft hole 41, a rigid wave plug 43 of uniform width and having an ellipsoidal external peripheral surface integrally formed on a circular external peripheral surface of the rotating shaft part 42, and a wave bearing 44 fitted on the ellipsoidal external peripheral surface. The wave bearing 44 is fitted between the ellipsoidal external peripheral surface of the wave plug 43 and an internal peripheral surface of the cylindrical barrel part 31 of the externally toothed gear 3, and the wave bearing holds the wave plug 43 and the externally toothed gear 3 in a state allowing relative rotation. The portion of the cylindrical barrel part 31 where the external teeth 32 are formed in the externally toothed gear 3 is caused to flex into an ellipsoidal shape by the wave bearing 44 fitted on the wave plug 43 and ellipsoidally flexed. The external teeth 32 positioned at both end portions of a major axis Lmax of the ellipsoidal shape mesh with the internal teeth 21 of the internally toothed gear 2.

Mechanism for Detecting Thrust Force

A distal end shaft part 6a of the motor shaft 6 is coaxially inserted into the shaft hole 41 in the rotating shaft part 42 of the wave generator 4 from the input side along the direction of the axis 1a. A linking mechanism 12 is incorporated between an internal peripheral surface of the shaft hole in the rotating shaft part 42 and an external peripheral surface of the distal end shaft part 6a of the motor shaft 6. The rotating shaft part 42 of the wave generator 4 is attached to the distal end shaft part 6a of the motor shaft 6 via the linking mechanism 12, so as to be capable of sliding in a relative manner in the direction of the axis 1a and to rotate integrally.

Figure 2A:
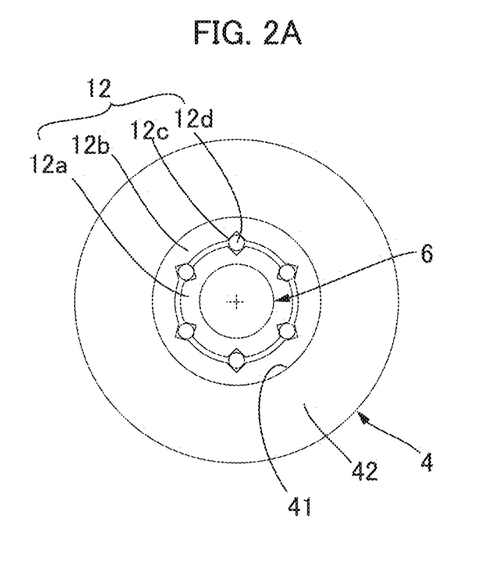
FIG. 2A is an explanatory drawing of one example of a linking mechanism.

FIG. 2A is an explanatory drawing of the linking mechanism 12. The linking mechanism 12 is a slide guide mechanism configured such that balls 12d (rolling elements) are inserted into rolling element raceway grooves 12c extending parallel to the direction of the axis 1*a*. The linking mechanism 12 is provided with an inner cylinder 12*a* fitted on the external peripheral surface of the motor shaft 6, and an outer cylinder 12*b* fitted on the internal peripheral surface of the shaft hole 41 in the rotating shaft part 42 of the wave generator 4. In the inner cylinder 12*a* and the outer cylinder 12*b*, spline grooves (V grooves) extending parallel to the axis 1*a* are formed at equal angular intervals in a circumferential direction. The rolling element raceway grooves 12*c*, which extend parallel to the axis 1*a* and have a rectangular cross section, are formed between an inner spline groove and an outer spline groove facing thereto. Six rolling element raceway grooves 12*c* are formed in the present example. One or more balls 12*d* (rolling elements) are inserted into each of the rolling element raceway grooves 12*c*. It is preferable that there be three or more rolling element raceway grooves 12*c* in the circumferential direction.

Figure 2B:
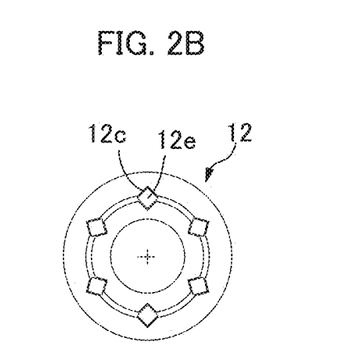
FIG. 2B is an explanatory drawing of another example of a linking mechanism.
Figure 2C:
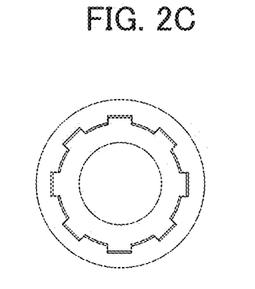
FIG. 2C is an explanatory drawing of one example of a splined linking mechanism.
Figure 2D:
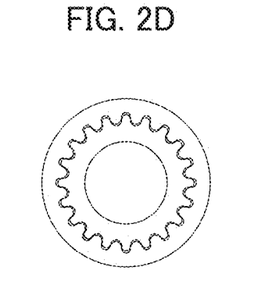
FIG. 2D is an explanatory drawing of one example of a splined linking mechanism.
Figure 2E:
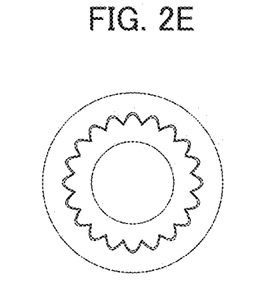
FIG. 2E is an explanatory drawing of one example of a splined linking mechanism.

Rollers can also be used as rolling elements instead of the balls 12*d*. FIG. 2B shows an example of a linking mechanism in a case in which rollers 12*e* are used as rolling elements. The linking mechanism 12 may also be a splined slide guide mechanism. FIGS. 2C, 2D, and 2E show examples of splined linking mechanisms.

The linking mechanism 12 should be linked to the motor shaft 6 such that the rotating shaft part 42 of the wave generator 4 is capable of sliding in relation to the motor shaft 6 along the direction of the axis 1*a* and the rotating shaft part rotates integrally with the motor shaft 6; the linking mechanism is not limited to the examples described above.

Figure 1A:
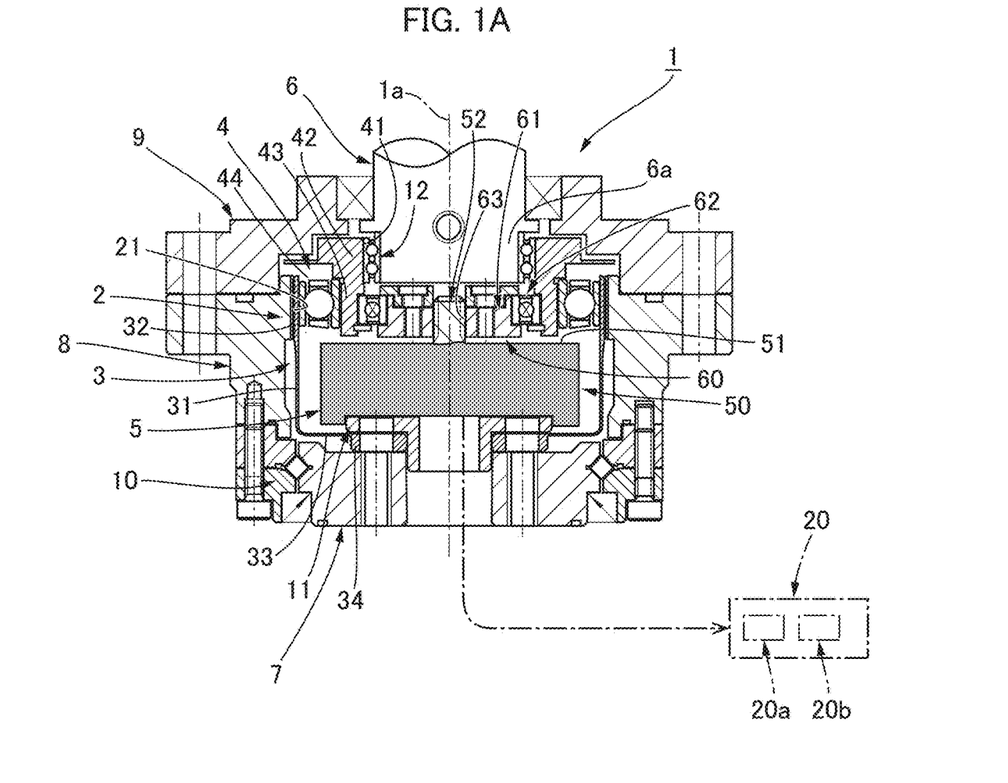
FIG. 1A is a schematic configuration diagram of one example of a cup-profile strain wave gearing to which the present invention is applied.
Figure 1B:
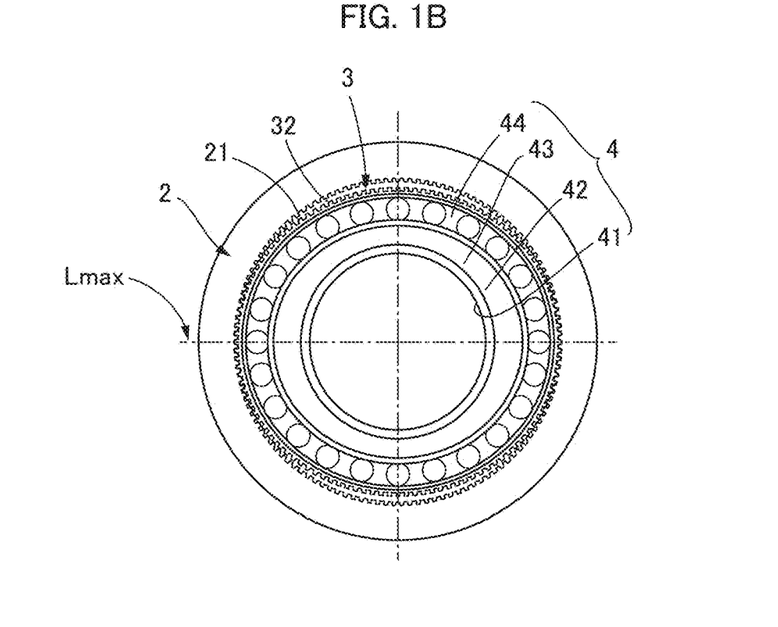
FIG. 1B is an explanatory drawing of an externally toothed gear in a state of mesh with an internally toothed gear in a strain wave gearing.

Next, the detection mechanism 5 is incorporated in a space inside the cylindrical barrel part 31 of the externally toothed gear 3, between the diaphragm 33 and boss 34 and the wave generator 4, as shown in FIG. 1A. In the present example, the detection mechanism 5 is provided with a flat disc-shaped load meter 50 (load cell) attached to the boss 34 of the externally toothed gear 3 at a fixed position in the direction of the axis 1*a*, and a transmission mechanism 60 that transmits the thrust force generated between the external gear 3 and the wave generator 4 to the load meter 50.

The load meter 50 converts the physical quantities of force and load into electrical signals, as is well known. A strain gauge or a piezoelectric element is used as a detection element. Compression-type load meters, tension-type load meters, and tension/compression-type load meters are known. In the present example, a strain gauge or piezoelectric tension-compression-type load meter 50 is used from the viewpoint that deformation under load is low and the axial position of the wave generator 4 can be maintained. From the center of the end face 51 of the load meter 50 on the wave generator 4 side, a linking threaded shaft 52 protrudes in the direction of the axis 1*a*.

The transmission mechanism 60 for transmitting thrust force to the load meter 50 is coaxially incorporated in the shaft hole 41 in the rotating shaft part 42 of the wave generator 4. The transmission mechanism 60 is attached to the rotating shaft part 42 so as to be capable of rotating in a relative manner and not to move relative to the direction of the axis 1*a*. The transmission mechanism 60 of the present example is provided with a transmission disc 61, a bearing 62 fitted on the external peripheral surface of the transmission disc 61, and a linking screw hole 63 passing through the center of the transmission disc 61 in the direction of the axis 1*a*. The bearing 62 is fitted between the external peripheral surface of the transmission disc 61 and the internal peripheral surface of the shaft hole 41 in the rotating shaft part 42. The linking screw shaft 52 of the load meter 50 is threaded into the linking screw hole 63 in the transmission disc 61 to link the transmission disc 61 and the load meter 50. With a simple structure, the transmission disc 61 of the transmission mechanism 60 and the load meter 50 can easily be positioned and assembled along the direction of the axis 1*a*.

Figure 3:
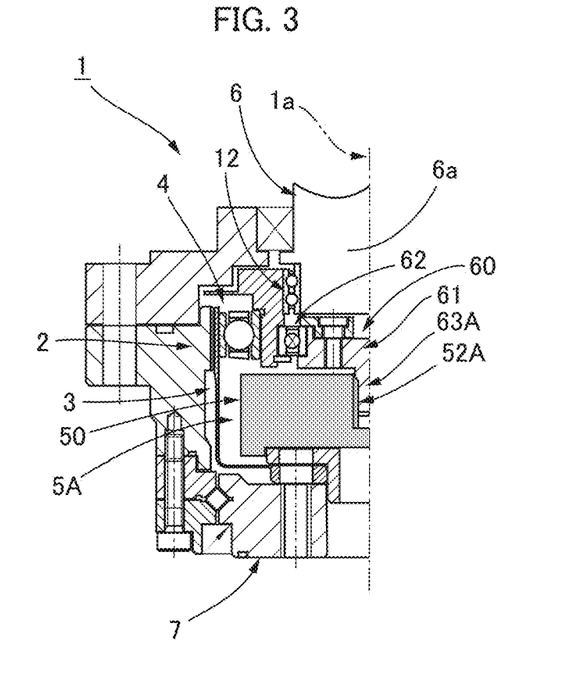
FIG. 3 is a half longitudinal cross-sectional view of a modified example of a detection mechanism of the strain wave gearing of FIG. 1A.

FIG. 3 is a half longitudinal cross-sectional view of the strain wave gearing 1, showing another example of the detection mechanism 5. The basic configuration of the detection mechanism 5A incorporated inside the externally toothed gear 3 of the strain wave gearing 1 is the same as that of the detection mechanism 5 described above; therefore, corresponding parts are denoted by the same reference numerals, and descriptions of these parts are omitted. In the detection mechanism 5A, a linking screw hole 52A is formed in the side of the load meter 50, and a linking screw shaft 63A is formed in the side of the transmission disc 61 of the transmission mechanism 60.

Description of Actions

In the strain wave gearing 1 having this configuration, when the wave generator 4 is caused to rotate at high speed by the motor shaft 6, the positions where the externally toothed gear 3 mesh with the internally toothed gear 2 move in the circumferential direction of the internally toothed gear 2. The number of teeth of the externally toothed gear 3 is 2n fewer than that of the internally toothed gear 2 (n being a positive integer). Because the internally toothed gear 2 is fixed in place in the present example, the externally toothed gear 3 is caused to rotate at low speed along with the rotation of the wave generator 4. The reduced rotation of the externally toothed gear 3 is outputted from the output shaft 7 linked to the boss 34 to a load side (not shown).

The motor shaft 6 and the rotating shaft part 42 of the wave generator 4 are linked via the linking mechanism 12, and rotate integrally while being capable of moving relatively in the direction of the axis 1*a*. In other words, only rotational force is transmitted from the external motor shaft 6 to the wave generator 4, and axial force is not transmitted. Therefore, thrust force generated between the externally toothed gear 3 and the wave generator 4 acts on the plug-integrated rotating shaft part 42 of the wave generator 4. The rotating shaft part 42 of the wave generator 4 and the load meter 50 are linked via the transmission mechanism 60, and can rotate relative to each other, but do not move relatively in the direction of the axis 1*a*. In other words, only thrust force, which is axial force, is transmitted, and rotational force is not transmitted. Therefore, thrust force acting on the wave generator 4 is transmitted to the load meter 50 via the transmission mechanism 60, and the thrust force is detected by the load meter 50.

A detection result from the detection mechanism 5 is supplied to the drive control device 20 either by wire or wirelessly. On the basis of the detection result from the detection mechanism 5, the operating state determination unit 20*a* of the drive control device 20 determines or calculates whether or not thrust force is generated, the direction of the thrust force, the magnitude of the thrust force, the change over time in the thrust force, etc. The operation control unit 20*b* performs operation control for the strain wave gearing 1 on the basis of the detection result from the detection mechanism 5 or the determination result from the operating state determination unit 20*a*.

Actuator

Figure 4:
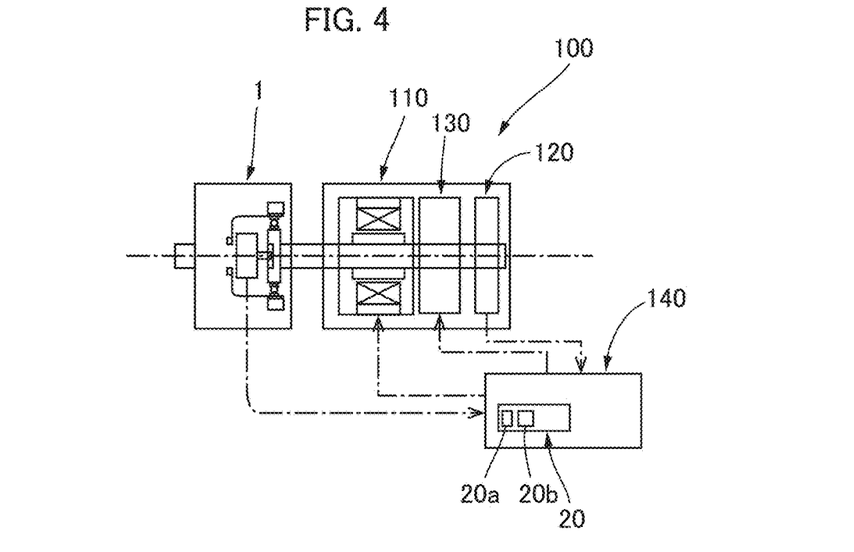
FIG. 4 is an explanatory drawing of one example of an actuator.

FIG. 4 is an explanatory drawing of one example of an actuator (rotary actuator) using the strain wave gearing 1 of the present example. As shown in this drawing, an actuator 100 is constituted of a motor 110, the strain wave gearing 1, which reduces and outputs motor output rotation, a rotation detection mechanism 120 and brake mechanism 130 incorporated into the motor 110, and a control device 140. The control device 140 is provided with the functions of the previously described operating state determination unit 20a and operation control unit 20b.

The control device 140 can perform operation control for the strain wave gearing 1 by controlling the driving of the motor 110 and the brake mechanism 130 and controlling rotation inputted to the strain wave gearing 1 (the wave generator 4) on the basis of the detected thrust force.

For example, the operating state is determined and operation control for the strain wave gearing 1 is performed as follows.

(1) Whether the strain wave gearing 1 is in a decelerating operation (reduced-rotation outputting operation) or accelerating operation (increases-rotation outputting operation) state is determined according to detection of the direction of thrust force. During accelerating operation, efficiency can be reduced and torque for holding the motor 110 can be reduced by friction torque from the brake mechanism 130 or the like.

(2) The following states can be determined on the basis of whether or not thrust force is being generated. Thrust force is not generated if the wave generator 4 and the motor shaft 6 linked thereto are completely locked. Therefore, it is possible to determine whether locking force on a target shaft is excessive or insufficient when action is stopped.

When other shafts such as those of a multi-shaft robot are in action, and when the designated shaft is not sufficiently locked by the strain wave gearing 1, accelerating operation is performed and thrust force is generated. Therefore, insufficient locking force can be addressed by increasing the locking force on the target shaft when action is stopped, using the brake mechanism 130 or the like.

(3) The magnitude and variation of the thrust force are greatly affected by load torque and the state of lubrication between the internal peripheral surface of the externally toothed gear 3 and the external peripheral surface of the outer race of the wave generator 4. The state of lubrication between the internal peripheral surface of the externally toothed gear 3 and the external peripheral surface of the outer race of the wave bearing 44 can be ascertained on the basis of the magnitude and variation of the thrust force.

The state of lubrication varies depending on the operating orientation and operating state (one-way constant continuous operation, high-load low-speed operation, short cycle and high acceleration rate in forward and reverse, long stop time, type and state of lubricant) of the strain wave gearing 1. Service life can be predicted and diagnosed on the basis of the state of lubrication.

If it is found that the state of lubrication has deteriorated, the state of lubrication can be restored to a favorable state. For example, it is possible to, inter alia, reduce the load torque, reduce the acceleration rate, and set an appropriate rotation speed and operating time.

Other Embodiments

The example described above is a case in which the present invention is applied to a cup-profile strain wave gearing. The present invention can also be applied to a top-hat-profile strain wave gearing and a pancake-profile strain wave gearing.

Figure 5:
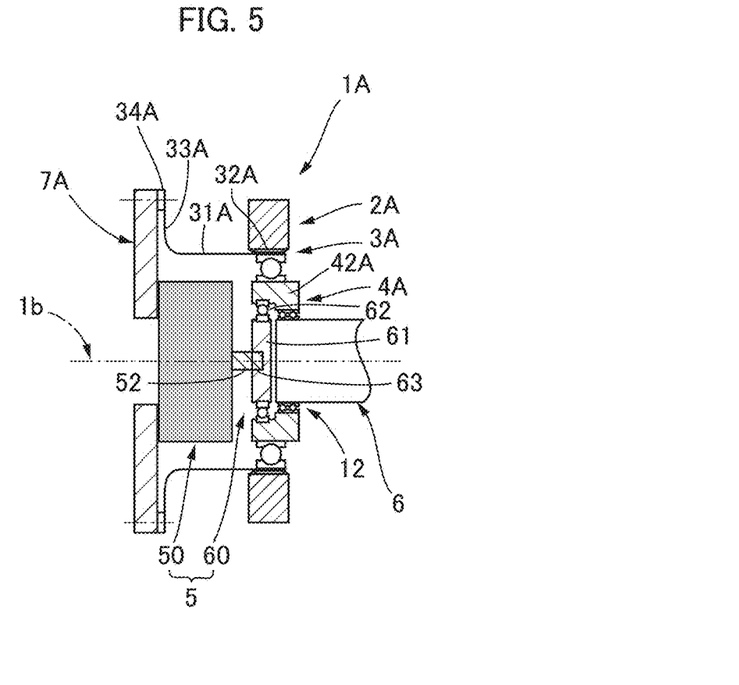
FIG. 5 is an explanatory drawing of an example of a top-hat-profile strain wave gearing to which the present invention is applied.

FIG. 5 is an explanatory drawing of a top-hat-profile strain wave gearing 1A into which a detection mechanism 5 is incorporated. The top-hat-profile strain wave gearing 1A has a rigid internally toothed gear 2A, a top-hat-shaped externally toothed gear 3A, and a wave generator 4A. The top-hat-shaped externally toothed gear 3A is provided with a cylindrical barrel part 31A, external teeth 32A formed on the external peripheral surface thereof, a diaphragm 33A spreading radially outward from one end of the cylindrical barrel part 31A, and an annular rigid boss 34A formed on the external peripheral edge of the diaphragm 33A.

A disc-shaped output shaft 7A is fixed to the boss 34A in a coaxial state. A detection mechanism 5 is incorporated between the output shaft 7A and the wave generator 4A in the direction of an axis 1b inside the cylindrical barrel part 31A of the externally toothed gear 3A. The detection mechanism 5 is provided with a load meter 50 attached to a center portion in an end surface of the output shaft 7A, and a transmission mechanism 60 incorporated between the load meter 50 and a rotating shaft part 42A of the wave generator 4A. The rotating shaft part 42A is linked to the motor shaft 6 via the linking mechanism 12.

Figure 6:
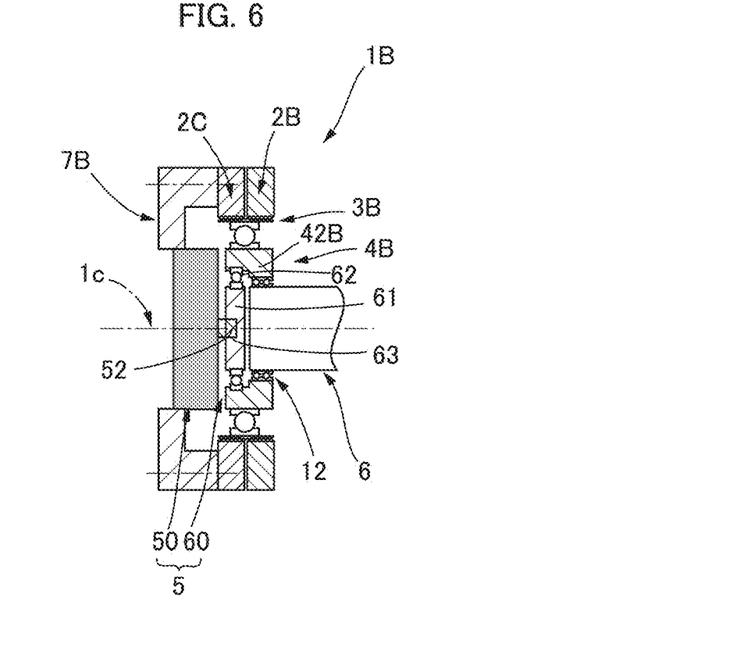
FIG. 6 is an explanatory drawing of an example of a pancake-profile strain wave gearing to which the present invention is applied.

FIG. 6 is an explanatory drawing of a pancake-profile strain wave gearing 1B into which a detection mechanism 5 is incorporated. The pancake-profile strain wave gearing 1B has a rigid internally toothed gear 2B, a flexible externally toothed gear 3B disposed coaxially inside the internally toothed gear 2B, a wave generator 4B that is disposed coaxially inside the externally toothed gear 3B and that causes the externally toothed gear 3B to flex into a non-circular form and partially mesh with the internally toothed gear 2B, and a detection mechanism 5 that detects thrust force generated between the wave generator 4B and the externally toothed gear 3B.

The strain wave gearing 1B also has a rigid drive-side internally toothed gear 2C coaxially disposed in alignment with the internally toothed gear 2B in the direction of an axis 1c. A disc-shaped output shaft 7B is coaxially fixed to the drive-side internally toothed gear 2C. The externally toothed gear 3B, caused to flex into a non-circle by the wave generator 4B, partially meshes with the drive-side internally toothed gear 2C as well. The externally toothed gear 3B is provided with a radially flexible cylindrical barrel part, and external teeth are formed in an external peripheral surface thereof. The internally toothed gear 2B has a different number of teeth than the externally toothed gear 3B, and the drive-side internally toothed gear 2C has the same number of teeth as the externally toothed gear 3B so as to rotate integrally with the externally toothed gear 3B.

Inside the cylindrical externally toothed gear 3B, a detection mechanism 5 is incorporated between the output shaft 7B and the wave generator 4B. The detection mechanism 5 is provided with a load meter 50 attached to a center portion in an end surface of the output shaft 7B, and a transmission mechanism 60 incorporated between the load meter 50 and a rotating shaft part 42B of the wave generator 4B. The rotating shaft part 42B is linked to the motor shaft 6 via a linking mechanism 12.

The invention claimed is:

1. A strain wave gearing comprising:
   a rigid internally toothed gear;
   a flexible externally toothed gear disposed coaxially inside the internally toothed gear;
   a wave generator that is disposed coaxially inside the externally toothed gear and that causes the externally toothed gear to flex into a non-circular form and partially mesh with the internally toothed gear; and a detection mechanism that detects thrust force generated between the wave generator and the externally toothed gear, the detection mechanism being provided with a load meter disposed in a fixed position in a direction of a device axis and a transmission mechanism that transmits the thrust force to the load meter, the wave generator being provided with a rotating shaft part linked to an external rotating shaft so as to rotate integrally while being able to move in a relative manner in the direction of the device axis, and the transmission mechanism being linked to the rotating shaft part of the wave generator so as not move in a relative manner in the direction of the device axis while being capable of relative rotation.

2. The strain wave gearing according to claim 1, wherein the wave generator is provided with:

a rigid wave plug provided with a non-circular external peripheral surface;

a wave bearing that is fitted between the externally toothed gear and the non-circular external peripheral surface of the wave plug, and that enables the wave plug and the externally toothed gear to rotate relative to each other;

the rotating shaft part integrally formed on or fixed to the wave plug; and a linking mechanism that links the rotating shaft part to an external rotating shaft such that the rotating shaft part can move relatively in the direction of the device axis and the rotating shaft part rotates integrally.

3. The strain wave gearing according to claim 2, wherein the linking mechanism is a splined slide guide mechanism or a slide guide mechanism configured such that rolling elements are inserted into axial raceway grooves extending parallel to the direction of the device axis.

4. The strain wave gearing according to claim 1, wherein:

the externally toothed gear is in the shape of a cup or a top hat, and is provided with a cylindrical barrel part capable of flexing in a radial direction, a diaphragm extending in the radial direction from one end of the cylindrical barrel part, a disc-shaped or annular rigid boss formed on an internal peripheral edge or external peripheral edge of the diaphragm, and external teeth formed on an external peripheral surface of the cylindrical barrel part;

the load meter is attached to the boss of the externally toothed gear or a boss attachment member attached to the boss, and the load meter faces the wave generator in the direction of the device axis; and the transmission mechanism is disposed between the load meter and the rotating shaft part.

5. The strain wave gearing according to claim 1, wherein:

the strain wave gearing comprises a rigid drive-side internally toothed gear disposed coaxially and in alignment with said internally toothed gear in the direction of the device axis;

the externally toothed gear, which is caused to flex into a non-circular form by the wave generator, partially meshes with the drive-side internally toothed gear;

the externally toothed gear is provided with a cylindrical barrel part capable of flexing in a radial direction, and external teeth formed on an external peripheral surface of the cylindrical barrel part;

the internally toothed gear has a different number of teeth than the externally toothed gear;

the drive-side internally toothed gear has the same number of teeth as the externally toothed gear so as to rotate integrally with the externally toothed gear;

the load meter is attached to the drive-side internally toothed gear or an attachment member attached to the drive-side internally toothed gear, and the load meter faces the wave generator from the direction of the device axis; and the transmission mechanism is disposed between the load meter and the rotating shaft part.

6. The strain wave gearing according to claim 1, further comprising:

an operating state determination unit that determines an operating state of the strain wave gearing on the basis of the detection result from the detection mechanism, and on the basis of at least one of the following: whether or not the thrust force is generated, the direction of the thrust force, the magnitude of the thrust force, and change over time in the thrust force.

7. The strain wave gearing according to claim 6, further comprising:

an operation control unit that performs operation control for the strain wave gearing on the basis of the detection result from the detection mechanism or a determination result from the operating state determination unit.

8. An actuator comprising:

the strain wave gearing according to claim 7, and a motor in which a motor shaft is linked to the rotating shaft part of the wave generator, the operation control unit performing the operation control for the strain wave gearing by controlling rotation inputted from the motor to the strain wave gearing.

9. The actuator according to claim 8, wherein the actuator further comprises a brake mechanism that controls rotation inputted to the strain wave gearing, and the operation control unit performs the operation control for the strain wave gearing by controlling the brake mechanism.

* * * * *